Dec. 29, 1925.
O. E. BUCKLEY
1,567,316
MEANS FOR REDUCING INTERFERENCE
Filed May 2, 1921
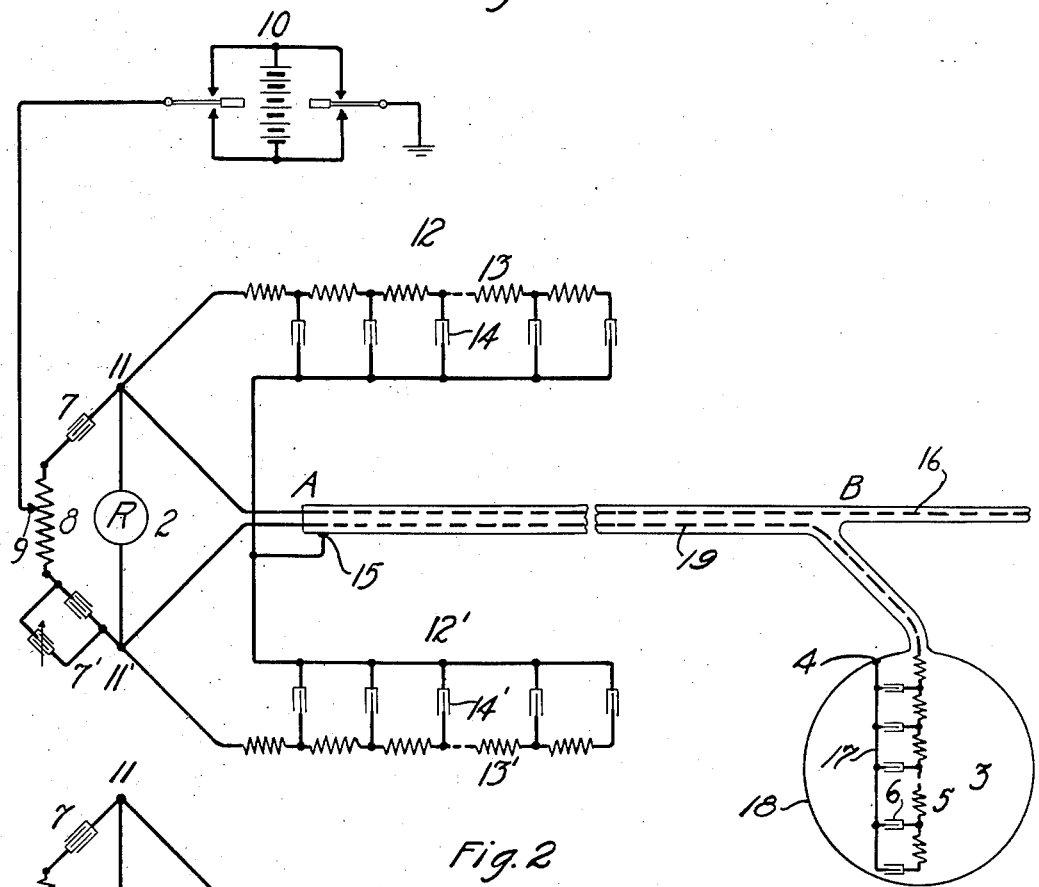
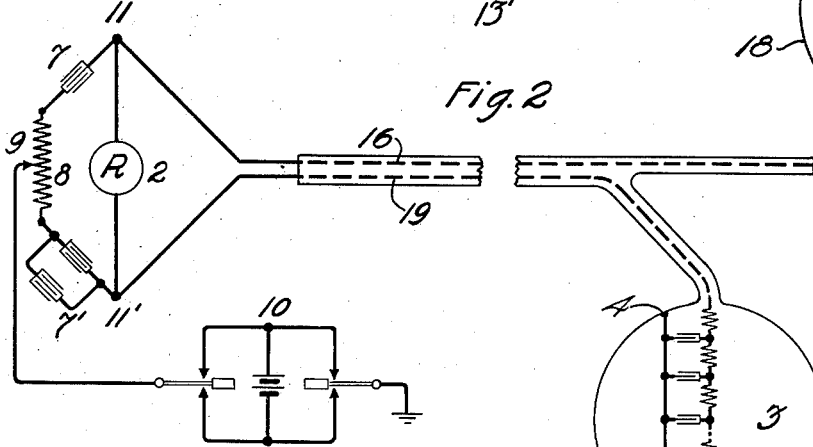
Inventor:
Oliver E. Buckley.
by Joel C. R. Palmer
Atty.

Patented Dec. 29, 1925.

1,567,316

UNITED STATES PATENT OFFICE.

OLIVER E. BUCKLEY, OF MAPLEWOOD, NEW JERSEY, ASSIGNOR TO WESTERN ELECTRIC COMPANY, INCORPORATED, OF NEW YORK, N. Y., A CORPORATION OF NEW YORK.

MEANS FOR REDUCING INTERFERENCE.

Application filed May 2, 1921. Serial No. 466,129.

*To all whom it may concern:*

Be it known that I, OLIVER E. BUCKLEY, a citizen of the United States of America, residing at Maplewood, in the county of Essex, State of New Jersey, have invented certain new and useful Improvements in Means for Reducing Interference, of which the following is a full, clear, concise, and exact description.

This invention relates to signaling over submarine cables or other conductors of like character and its object is to reduce the effect of interfering currents induced from outside sources, and at the same time to provide means for obtaining and maintaining accurate balance in cases in which cables are operated by the duplex method.

The object of this invention is attained by balancing against the main cable conductor a similar conductor of short length laid parallel to the main conductor and terminated in an artificial line having practically the same electrical characteristics as the cable and by paralleling both the main cable conductor and the balancing or sea ground conductor with secondary artificial lines having practically equal electrical characteristics. By means of these secondary artificial lines provision is made to establish a complete and accurate balance for duplex operation.

The limiting speed of signaling over long submarine telegraph cables is in most cases determined by interference arising either from lack of perfect duplex balance or from external sources. That which arises from lack of perfect duplex balance could, of course, be reduced by more carefully matching the artificial line to the cable, but in the systems at present commonly used an accurate balance, even if obtained at one time, cannot be maintained for long since temperature changes may affect the electrical constants of the cable rendering the balance imperfect.

The interference from external sources may arise either from neighboring power circuits or may come from natural sources. One method which has been employed to reduce the external interference is to make the ground connection of the balancing artificial line to a second conductor called the sea ground conductor which runs parallel to the main cable conductor usually in the same sheath to a point several miles from shore where a ground connection is made to the cable sheath. This sea ground conductor generally has the same electrical constants as the main cable conductor. Although some advantage is obtained by this procedure, disturbances are not completely eliminated for although the same electromotive forces are induced both in the main conductor and in the sea ground conductor, the currents produced in the two conductors are different owing to the difference in impedance to ground. In order to completely eliminate the effect of external interference by means of a sea ground, it would be necessary to run the sea ground conductor out to a point sufficiently far from the receiving station that no sensible disturbance is received from beyond that point, and there to terminate it in an artificial line having substantially the same impedance as the cable beyond that point. If the main cable conductor is now balanced by such a sea ground conductor and artificial line, the two terminals of the receiving apparatus will be subject to equal variations of potential as a result of currents induced in the cable conductor and sea ground conductor from external sources and such disturbances will have no effect on a receiving instrument. A further advantage is obtained in that the cable conductor and the sea ground conductor being close together or in the same sheath are subjected to the same temperature changes and, if the two are similar to the same variations in electrical characteristics with the result that temperature variations will not impair the duplex balance providing the artificial line is located sufficiently far out at sea that the cable beyond it is not subject to temperature changes, the temperature of the ocean bottom being substantially constant when a sufficient depth is reached. To accomplish this advantage requires, of course, a submerged artificial line but it has never been considered practicable to place the artificial line for a long submarine telegraph cable in a submerged container at sea in the manner required since it would not, if so placed, be available for such adjustments as might be necessary to obtain a perfect balance, or to match variations in the cable caused by repairs or changes with time. The invention provides means for obtaining an accurate balance and for correcting the balance if at any time it is destroyed even though the main artificial line be located at sea or in any other inaccessible place.

The invention will be more fully understood from a consideration of the accompanying drawing in which Fig. 1 represents one embodiment thereof applied to a cable for duplex operation. Fig. 2 is a simplified circuit of a duplex bridge.

Referring to the drawing, the terminal apparatus comprises the usual duplex equipment including the ratio arms 7 and 7' joined by the apex resistance 8 to which the transmitting apparatus 10 is connected through an adjustable contact 9. Across the corners 11 and 11' of the duplex bridge, more clearly shown in Fig. 2, is the receiving apparatus 2 which is connected to the main cable conductor 16 forming one arm of the duplex bridge and through the other arm consisting of the sea ground conductor 19 and the submerged artificial line 3, to a ground connection 4. It will be noted that instead of connecting the artificial line directly to the receiving apparatus and making its ground connection to the sea ground conductor as is commonly done in practice, the artificial line is in this case, connected to the distant end of the sea ground conductor with the result that the impedance to ground from any point on the sea ground conductor is the same as that from an adjacent point on the main conductor. Consequently interfering currents induced from external sources will be neutralized as regards their effect on the receiving instrument 2. Furthermore, temperature changes affecting the electrical characteristics of the main conductor between the points A and B will affect the corresponding part of the sea ground conductor in the same manner and to the same degree, and consequently have no effect on the accuracy of balance.

The artificial line 3 is shown in the diagram as consisting of series resistances 5 and shunt capacities 6 connected to a common conductor 17, thence to ground connection 4 which may conveniently be made on the containing case 18 of the artificial line.

If the main conductor and the sea ground conductor were exactly alike and if the artificial line 3 exactly balanced the cable 16 beyond the point B, the arrangement of Fig. 2 would be sufficient to insure proper functioning of the terminal apparatus but it is practically impossible to insure an accurate balance between the artificial line 3 and the cable 16 beyond the point B when the artificial line 3 is located at sea where it is inaccessible. Additional means are therefore provided as shown in Fig. 1 so that the circuit may be adjusted from time to time, to maintain the accuracy of balance required for duplex operation. This is accomplished by connecting to the point 11 of the duplex bridge the artificial line 12 comprising adjustable series resistances and shunt condensers, and to the opposite point 11' a similar artificial line 12'. Artificial lines 12 and 12' may be grounded at the common point 15.

In order that there will be no disturbance in the receiving apparatus 2 while impulses are being sent by the transmitter 10, it is necessary that the potentials of points 11 and 11' be equally affected by the transmitting current. If, however, there is a source of unbalance disturbance owing to the failure of the artificial line 3 to balance the main cable, this source of unbalance can be corrected by a change in either the artificial line 12 or the artificial line 12'. As a particular case, let us suppose that the resistance 5 of artificial line 3 is too large to properly balance the electrically corresponding part of the cable 16. As a result, the transmitted signal will be reflected differently from the artificial line 3 than from the corresponding part of the cable 16, establishing a difference of potential between points 11 and 11' and producing a disturbing current in the receiving apparatus 2. This disturbance may be eliminated by increasing the resistance 13 of the artificial line 14 to such a degree that a disturbance reflected therefrom will just compensate that reflected from the artificial line 3 and the balance will be thereby restored. The same result might be accomplished by decreasing the corresponding resistance 13' in the artificial line 14'.

If artificial lines 12 and 12' were of just the same impedance as the main cable, resistance 13 would have to be increased or resistance 13' diminished by just the amount that resistance 5 is too large. However, under certain conditions it is objectionable to have artificial lines 12 and 12' of the same impedance as the main cable since in this case a considerable part of the incoming signals would be diverted by these artificial lines and the received signal thereby reduced. In order to reduce the shunting effect of artificial lines 12 and 12' it may be desirable to make them of higher impedance than the main cable but in this case changes in the auxiliary artificial lines 12 or 12' required to effect a balance would have to be larger than the variation in the resistance 5 which it is desired to compensate. By the proper design of the artificial lines 12 and 12', the shunting effect on the received signal may be reduced so as not to prove objectionable.

As described above, the method is applied to the ordinary cable of negligible inductance. It is understood, however, that the same method of correction may be applied equally well to an inductively loaded cable by merely providing artificial lines 3, 12, and 12' with the proper amount of inductance to correspond to that of the main conductor.

What is claimed is:

1. A duplex signaling system comprising a pair of conducting signaling paths, a receiver bridged across said paths, and a separate artificial line simulating distributed capacity and resistance connected to each side of the receiver in parallel with each path.

2. A duplex signaling system comprising a pair of conducting paths, one of said conducting paths having an artificial line connected in series therein simulating distributed impedance of a portion at least of the other of said paths, a receiver bridged across said paths, and a separate secondary artificial line simulating distributed capacity and resistance connected to each side of the receiver in parallel with each path.

3. A submarine cable duplex bridge system comprising a main cable in one arm of the bridge, a return circuit comprising a section of cable core similar to that of the main cable and parallel thereto and terminating in a sea earth through an artificial line simulating the impedance of the main cable, said section of cable core being directly connected to one apex of the bridge and being in an arm of the bridge different from said main cable.

4. A duplex signaling system comprising a pair of conducting paths, a transmitter for signalling thereover, a receiver bridged across said paths, said paths being in different arms of the duplex bridge, and separate artificial lines simulating distributed capacity and resistance connected to each side of the receiver in parallel with each of said paths for balancing the circuit for duplex operation.

5. A duplex signaling system comprising a submarine cable, a conductor extending from a terminal of said cable to a deep water point at sea and there grounded, an artificial line at sea connected to said conductor and simulating the impedance of the cable, a receiver connected between the terminals of said cable and said conductor, and an auxiliary artificial line connected between one terminal of said receiver and ground and comprising sections containing series resistance and shunt capacity.

6. A duplex signaling system comprising a submarine cable, a conductor grounded through an artificial line at sea, said artificial line simulating the impedance of the cable, a receiver connected between said cable and said conductor, and means bridging said receiver for balancing the circuit for duplex operation.

7. A duplex signaling system comprising a submarine cable, a conductor grounded through an artificial line at sea, said artificial line simulating the impedance of the cable, a receiver connected between said cable and said conductor, and two secondary artificial lines connected in series and grounded at their junction bridged across said receiver.

8. A duplex signaling system comprising a submarine cable, a conductor grounded through an artificial line at sea, said artificial line simulating the impedance of the cable, a receiver connected between said cable and said conductor and two equal adjustable artificial lines connected in series and grounded at their junction bridged across said receiver.

9. In a duplex signaling system, a line conductor, a parallel circuit, said conductor and said parallel circuit connected to the opposite corners of a Wheatstone bridge, a receiver connected in the diagonal thereof, two arms having adjustable condensers and adjustable resistances connected therein, and two arms having equal artificial lines.

10. A signaling system comprising a submarine cable, terminal signaling apparatus therefor. a conductor connecting said terminal apparatus with said cable, a second conductor similar to said first conductor extending parallel thereto from said terminal apparatus to a point at sea, an artificial line simulating said cable and connected to said second conductor at its sea end, a receiver in said terminal apparatus bridging said conductors and an adjustable artificial line simulating distributed resistance and capacity connected to one side of the receiver and ground for compensating for any unbalance due to change of characteristics of the cable or sea artificial line.

11. A terminal system for a submarine cable comprising an artificial line at sea connected with the terminal of the cable through a long conductor paralleling the cable or its shore end connection, a receiver connected between said conductor and said cable, or its shore end connection, an auxiliary artificial line simulating distributed capacity and resistance associated with said conductor and said cable, or its shore end connection, said long conductor and the adjacent portion of the cable being symmetrically arranged with respect to said receiver to prevent unbalance due to temperature changes of the shore end of the cable adjacent said conductor.

12. The combination with a submarine cable of a ground therefor at sea connected with a terminal of the cable through a long conductor paralleling the cable or its shore end connection, a receiver connected between said conductor and said cable or its shore end connection, a main artificial line at sea connected with the sea end of said conductor, and two auxiliary adjustable artificial lines simulating distributed capacity and resistance connected on the one hand to the terminal respectively of said receiver and on the other to ground or a terminal of said main artificial line.

13. A duplex signaling system comprising a pair of conducting signaling paths, each of which terminates in an earth connection, a receiver bridged across said paths and a separate artificial line simulating distributed capacity and resistance connected to each side of the receiver in parallel with each path.

14. A duplex signaling system comprising a pair of conducting paths, each of which comprises a section of submarine cable, a transmitter for signaling thereover, a receiver bridged across said paths and separate means connected to each side of the receiver in parallel with each of said paths for balancing the circuit for duplex operation.

In witness whereof, I hereunto subscribe my name this 29th day of April A. D. 1921.

OLIVER E. BUCKLEY.